(12) United States Patent
Kobayashi et al.

(10) Patent No.: US 8,760,461 B2
(45) Date of Patent: Jun. 24, 2014

(54) DEVICE, SYSTEM, AND METHOD FOR WIDE GAMUT COLOR SPACE SUPPORT

(75) Inventors: Osamu Kobayashi, Los Altos, CA (US); Zisheng Le, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 737 days.

(21) Appl. No.: 12/711,610

(22) Filed: Feb. 24, 2010

(65) Prior Publication Data

US 2010/0289812 A1    Nov. 18, 2010

Related U.S. Application Data

(60) Provisional application No. 61/177,962, filed on May 13, 2009.

(51) Int. Cl.
*G09G 5/02*    (2006.01)
*G06F 13/14*    (2006.01)

(52) U.S. Cl.
USPC .......................................... 345/590; 345/519

(58) Field of Classification Search
CPC . G06G 5/02; G06G 2340/16; G06G 2340/06; G06G 2370/04; G06G 5/04
See application file for complete search history.

(56) References Cited

U.S. PATENT DOCUMENTS

| | | |
|---|---|---|
| 4,479,142 A | 10/1984 | Buschman et al. |
| 4,796,203 A | 1/1989 | Roberts |
| 5,245,612 A | 9/1993 | Kachi et al. |
| 5,258,983 A | 11/1993 | Lane et al. |
| 5,369,775 A | 11/1994 | Yamasaki et al. |
| 5,425,101 A | 6/1995 | Woo et al. |
| 5,515,296 A | 5/1996 | Agarwal |
| 5,541,919 A | 7/1996 | Yong et al. |
| 5,608,418 A | 3/1997 | McNally |
| 5,615,376 A | 3/1997 | Ranganathan |
| 5,625,379 A | 4/1997 | Reinert et al. |
| 5,629,715 A | 5/1997 | Zenda |
| 5,670,973 A | 9/1997 | Bassetti, Jr. et al. |
| 5,739,803 A | 4/1998 | Neugebauer |
| 5,745,837 A | 4/1998 | Fuhrmann |
| 5,790,083 A | 8/1998 | Bassetti |
| 5,805,173 A | 9/1998 | Glennon et al. |
| 5,838,875 A | 11/1998 | Cho et al. |
| 5,852,630 A | 12/1998 | Langberg et al. |
| 5,909,465 A | 6/1999 | Bottomley et al. |
| 5,918,002 A | 6/1999 | Klemets et al. |

(Continued)

FOREIGN PATENT DOCUMENTS

| | | |
|---|---|---|
| CN | 1353513 | 6/2002 |
| EP | 0 354 480 A | 2/1990 |

(Continued)

OTHER PUBLICATIONS

U.S. Appl. No. 61/179,289, filed May 18, 2009.

(Continued)

*Primary Examiner* — Kee M Tung
*Assistant Examiner* — Sing-Wai Wu
(74) *Attorney, Agent, or Firm* — Beyer Law Group LLP

(57) ABSTRACT

Methods, chips, systems, computer program products and data structures are described for conducting modification of color video signals from a first color format associated with an originating format to a second format compatible with a display media of a display device.

26 Claims, 6 Drawing Sheets

(56) References Cited

U.S. PATENT DOCUMENTS

| | | |
|---|---|---|
| 5,926,155 A | 7/1999 | Arai et al. |
| 5,940,137 A | 8/1999 | Hulvey |
| 5,949,437 A | 9/1999 | Clark |
| 6,005,861 A | 12/1999 | Humpleman |
| 6,020,901 A | 2/2000 | Lavelle et al. |
| 6,038,000 A | 3/2000 | Hurst, Jr. |
| 6,049,316 A | 4/2000 | Nolan et al. |
| 6,049,769 A | 4/2000 | Holmes et al. |
| 6,069,929 A | 5/2000 | Yabe et al. |
| 6,151,334 A | 11/2000 | Kim et al. |
| 6,151,632 A | 11/2000 | Chaddha et al. |
| 6,154,225 A | 11/2000 | Kou et al. |
| 6,175,573 B1 | 1/2001 | Togo et al. |
| 6,177,922 B1 | 1/2001 | Schiefer et al. |
| 6,219,736 B1 | 4/2001 | Klingman |
| 6,223,089 B1 | 4/2001 | Page |
| 6,249,319 B1 | 6/2001 | Post |
| 6,326,961 B1 | 12/2001 | Lin et al. |
| 6,330,605 B1 | 12/2001 | Christensen et al. |
| 6,337,964 B2 | 1/2002 | Inami et al. |
| 6,353,594 B1 | 3/2002 | Tooker et al. |
| 6,356,260 B1 | 3/2002 | Montalbo |
| 6,437,768 B1 | 8/2002 | Kubota et al. |
| 6,441,857 B1 | 8/2002 | Wicker et al. |
| 6,446,130 B1 | 9/2002 | Grapes |
| 6,477,252 B1 | 11/2002 | Faber et al. |
| 6,542,967 B1 | 4/2003 | Major |
| 6,543,053 B1 | 4/2003 | Li et al. |
| 6,545,688 B1 | 4/2003 | Loveridge et al. |
| 6,577,303 B2 | 6/2003 | Kim |
| 6,587,480 B1 | 7/2003 | Higgins et al. |
| 6,598,161 B1 | 7/2003 | Kluttz et al. |
| 6,600,469 B1 | 7/2003 | Nukiyama et al. |
| 6,608,828 B1 | 8/2003 | Balachandran |
| 6,614,800 B1 | 9/2003 | Genty et al. |
| 6,661,422 B1 | 12/2003 | Valmiki et al. |
| 6,697,376 B1 | 2/2004 | Son et al. |
| 6,704,310 B1 | 3/2004 | Zimmermann et al. |
| 6,765,931 B1 | 7/2004 | Rabenko et al. |
| 6,778,168 B2 | 8/2004 | Mamiya et al. |
| 6,862,606 B1 | 3/2005 | Major et al. |
| 6,865,188 B1 | 3/2005 | Stirling et al. |
| 6,873,625 B1 | 3/2005 | Yoo et al. |
| 6,903,716 B2 | 6/2005 | Kawabe et al. |
| 6,909,442 B2 | 6/2005 | Hiyama et al. |
| 6,914,637 B1 | 7/2005 | Wolf et al. |
| 6,963,968 B2 | 11/2005 | Kori |
| 6,973,069 B1 | 12/2005 | Spear et al. |
| 6,975,645 B1 | 12/2005 | Suzuki et al. |
| 7,046,631 B1 | 5/2006 | Giroux et al. |
| 7,075,987 B2 | 7/2006 | Kim et al. |
| 7,099,277 B2 | 8/2006 | Sahinoglu et al. |
| 7,136,415 B2 | 11/2006 | Yun et al. |
| 7,177,329 B2 | 2/2007 | Kobayashi |
| 7,194,554 B1 | 3/2007 | Short et al. |
| 7,248,590 B1 | 7/2007 | Liu |
| 7,256,790 B2 | 8/2007 | Valmiki et al. |
| 7,295,578 B1 | 11/2007 | Lyle et al. |
| 7,525,975 B2 | 4/2009 | Caspi et al. |
| 2001/0030649 A1 | 10/2001 | Mamiya et al. |
| 2001/0036193 A1 | 11/2001 | Kori |
| 2001/0038387 A1 | 11/2001 | Tomooka et al. |
| 2001/0052011 A1 | 12/2001 | Nagao |
| 2002/0007452 A1 | 1/2002 | Traw et al. |
| 2002/0011996 A1 | 1/2002 | Inoue et al. |
| 2002/0060676 A1 | 5/2002 | Kim |
| 2002/0061024 A1 | 5/2002 | Malkemes et al. |
| 2002/0062394 A1 | 5/2002 | Bunn et al. |
| 2002/0071055 A1 | 6/2002 | Ooshima et al. |
| 2002/0071390 A1 | 6/2002 | Reeves et al. |
| 2002/0075902 A1 | 6/2002 | Abbas et al. |
| 2002/0080468 A1 | 6/2002 | Crummey et al. |
| 2002/0085582 A1 | 7/2002 | Kim |
| 2002/0089517 A1 | 7/2002 | Ludtke et al. |
| 2002/0122515 A1 | 9/2002 | Bodenschatz |
| 2002/0136219 A1 | 9/2002 | Ding et al. |
| 2002/0149617 A1 | 10/2002 | Becker |
| 2002/0163598 A1 | 11/2002 | Pasqualino |
| 2002/0164022 A1 | 11/2002 | Strasser et al. |
| 2002/0184327 A1 | 12/2002 | Major et al. |
| 2002/0190974 A1 | 12/2002 | Morita |
| 2002/0190978 A1 | 12/2002 | Agarwal et al. |
| 2003/0035442 A1 | 2/2003 | Eng |
| 2003/0048852 A1 | 3/2003 | Hwang et al. |
| 2003/0063077 A1 | 4/2003 | Koyama |
| 2003/0067626 A1* | 4/2003 | Ohmori et al. ............... 358/1.15 |
| 2003/0076282 A1 | 4/2003 | Ikeda et al. |
| 2003/0080971 A1 | 5/2003 | Hochmuth et al. |
| 2003/0112822 A1 | 6/2003 | Hong et al. |
| 2003/0145258 A1 | 7/2003 | Warner et al. |
| 2003/0149987 A1 | 8/2003 | Pasqualino et al. |
| 2003/0152160 A1 | 8/2003 | Bauch et al. |
| 2003/0174156 A1 | 9/2003 | Katsuhara et al. |
| 2003/0174795 A1 | 9/2003 | Bruhnke et al. |
| 2003/0177423 A1 | 9/2003 | Komatsu et al. |
| 2003/0212811 A1 | 11/2003 | Thornton |
| 2004/0049705 A1 | 3/2004 | Liebenow |
| 2004/0080671 A1 | 4/2004 | Siemens et al. |
| 2004/0081151 A1 | 4/2004 | Greis et al. |
| 2004/0088469 A1 | 5/2004 | Levy |
| 2004/0103333 A1 | 5/2004 | Martwick et al. |
| 2004/0114607 A1 | 6/2004 | Shay et al. |
| 2004/0198386 A1 | 10/2004 | Dupray |
| 2004/0203383 A1 | 10/2004 | Kelton et al. |
| 2004/0210805 A1 | 10/2004 | Kimelman et al. |
| 2004/0218598 A1 | 11/2004 | Kobayashi |
| 2004/0218599 A1 | 11/2004 | Kobayashi |
| 2004/0218624 A1 | 11/2004 | Kobayashi |
| 2004/0218625 A1 | 11/2004 | Kobayashi |
| 2004/0218627 A1 | 11/2004 | Kobayashi |
| 2004/0221056 A1 | 11/2004 | Kobayashi |
| 2004/0221180 A1 | 11/2004 | Enami et al. |
| 2004/0221312 A1 | 11/2004 | Kobayashi |
| 2004/0221315 A1 | 11/2004 | Kobayashi |
| 2004/0228365 A1 | 11/2004 | Kobayashi |
| 2004/0233181 A1 | 11/2004 | Kobayashi |
| 2004/0240454 A1 | 12/2004 | Yamauchi et al. |
| 2004/0243905 A1 | 12/2004 | Merritt |
| 2005/0062699 A1 | 3/2005 | Kobayashi |
| 2005/0062711 A1 | 3/2005 | Kobayashi |
| 2005/0066085 A1 | 3/2005 | Kobayashi |
| 2005/0103333 A1 | 5/2005 | Bonutti |
| 2005/0225547 A1 | 10/2005 | Choi |
| 2006/0036788 A1 | 2/2006 | Galang et al. |
| 2006/0059092 A1 | 3/2006 | Burshan et al. |
| 2006/0117371 A1 | 6/2006 | Margulis |
| 2006/0209890 A1 | 9/2006 | MacMullen et al. |
| 2007/0049086 A1 | 3/2007 | Sakane |
| 2007/0097885 A1 | 5/2007 | Traversat et al. |
| 2007/0140298 A1 | 6/2007 | Eng |
| 2008/0175277 A1 | 7/2008 | Yin et al. |
| 2008/0259092 A1* | 10/2008 | Hayward ....................... 345/604 |
| 2008/0284761 A1 | 11/2008 | Knee et al. |
| 2009/0147021 A1* | 6/2009 | Glen ............................. 345/603 |
| 2009/0167955 A1* | 7/2009 | Pettitt et al. .................. 348/649 |
| 2009/0284554 A1* | 11/2009 | Doser ........................... 345/690 |
| 2010/0008427 A1* | 1/2010 | Chiu et al. ................. 375/240.18 |

FOREIGN PATENT DOCUMENTS

| | | |
|---|---|---|
| EP | 0 385 449 A1 | 9/1990 |
| EP | 0 674 440 A2 | 9/1995 |
| EP | 0 674 441 A1 | 9/1995 |
| EP | 078 8048 | 6/1997 |
| EP | 1 041 823 A2 | 10/2000 |
| EP | 1 069 721 A2 | 1/2001 |
| EP | 1 089 503 | 4/2001 |
| EP | 1 154 354 A | 11/2001 |
| EP | 1 229 690 A | 8/2002 |
| EP | 1 251 664 A2 | 10/2002 |
| EP | 1 432 203 | 6/2004 |
| EP | 1 473 700 | 11/2004 |
| EP | 1 517 292 A2 | 3/2005 |
| EP | 1 519 349 A2 | 3/2005 |

(56) References Cited

FOREIGN PATENT DOCUMENTS

| EP | 1 519 581 A1 | 3/2005 |
|---|---|---|
| GB | 2 329 741 A | 3/1999 |
| JP | 03/153299 | 7/1991 |
| JP | 10145309 | 5/1998 |
| JP | 11175045 | 7/1999 |
| JP | 2001 218082 | 8/2001 |
| JP | 2001036900 | 9/2001 |
| JP | 2002 304168 | 10/2002 |
| SG | 110144 | 4/2005 |
| WO | WO95/00917 | 1/1995 |
| WO | WO95/13681 | 5/1995 |
| WO | WO98/41008 | 9/1998 |
| WO | WO99/63513 | 12/1999 |
| WO | WO00/20974 | 4/2000 |
| WO | WO02/25822 A2 | 3/2002 |
| WO | WO02/25885 | 3/2002 |
| WO | WO02/065746 | 8/2002 |
| WO | WO03/058376 | 7/2003 |

OTHER PUBLICATIONS

U.S. Appl. No. 61/179,292, filed May 18, 2009.
U.S. Appl. No. 61/179,293, filed May 18, 2009.
U.S. Appl. No. 61/179,295, filed May 18, 2009.
Office Action dated Mar. 9, 2010 in U.S. Appl. No. 10/726,794.
Office Action dated Sep. 17, 2009 in U.S. Appl. No. 10/726,794.
Office Action dated Apr. 2, 2009 in U.S. Appl. No. 10/726,794.
Search Report dated Oct. 12, 2005 from Singapore Patent Application No. 200405115-7.
Office Action mailed Jun. 27, 2007 from U.S. Appl. No. 10/726,794.
Office Action mailed Nov. 27, 2007 from U.S. Appl. No. 10/726,794.
Office Action dated Mar. 31, 2008 from U.S. Appl. No. 10/726,794.
Office Action dated Jun. 24, 2008 from U.S. Appl. No. 10/726,794.
Office Action dated Sep. 11, 2009 in U.S. Appl. No. 10/726,441.
Office Action dated Apr. 3, 2009 in CN Patent Application No. 200410044503.5.
Notice of Allowance dated Jun. 25, 2009 in U.S. Appl. No. 11/747,839.
Notice of Allowance dated Jul. 8, 2009 in U.S. Appl. No. 10/726,440.
Office Action dated Sep. 10, 2009 in U.S. Appl. No. 10/909,027.
Universal Serial Bus Specification, Revision 2.0, Apr. 27, 2000, p. 143.
Universal Serial Bus Specification, Revision 2.0, Apr. 27, 2000, pp. 7, 19, 32-34, 36, 38, 39, 43, 44, 48-51, 58, 66, 67, 72-74, 85, 86, 132, 206-209, 228, 229, 242-244, 269, 270, 278.
Fairhurst, MPEG-2 Transmission, Jan. 2001, pp. 1-9 from Internet at http://www.erg.abdn.ac.uk/research/future-net/digital-video/mpeg2-trans.html.
Office Action dated May 14, 2009 in U.S. Appl. No. 10/726,895.
Office Action dated Sep. 21, 2009 in U.S. Appl. No. 10/726,895.
Barr, "Copy Protection for High-Definition Baseband Video," Information Technology: Coding and Computing (online at http://ieeexplore.ieee.org/stamp/stamp.jsp?arnumber=844202&isnumber=18266, Aug. 6, 2002.
Office Action dated Oct. 21, 2008 from U.S. Appl. No. 11/747,839.
Office Action dated Oct. 31, 2008 in Chinese Patent Application No. 200410095171.3.
Chinese Office Action dated Nov. 28, 2008 in CN Application No. 200410071497.2.
Office Action dated Jan. 5, 2009 in U.S. Appl. No. 10/726,440.
Notice of Allowance dated Jan. 7, 2009 in U.S. Appl. No. 11/742,387.
Office Action dated Mar. 3, 2009 in U.S. Appl. No. 10/726,440.
Office Action dated Mar. 4, 2009 in U.S. Appl. No. 10/726,350.
Office Action dated Mar. 6, 2009 in CN Patent Application No. 200410043419.1.
Office Action dated Mar. 13, 2009 in CN Patent Application No. 200410095171.3.
Search Report dated Apr. 2, 2009 in EP Application No. 08153454.7.
Office Action dated Apr. 6, 2009 in U.S. Appl. No. 10/909,027.
Office Action dated May 26, 2009 in U.S. Appl. No. 11/742,222.
Office Action dated Apr. 4, 2008 in CN Patent Application No. 200410043419.1.
Office Action dated Sep. 12, 2008 in CN Patent Application No. 200410044503.5.
Office Action dated Oct. 8, 2009 in U.S. Appl. No. 11/776,411.
Examination Report dated Mar. 1, 2006 from Singapore Patent Application No. 200402057-4.
Search Report dated Mar. 15, 2006 from European Patent Application No. 04255610.0.
Austrian Search and Exam Report dated Feb. 16, 2007 issued in corresponding Singapore Application No. 200401973-3.
Office Action mailed Jul. 9, 2007 from related U.S. Appl. No. 10/726,895.
Office Action mailed Dec. 28, 2007 from U.S. Appl. No. 10/726,895.
Office Action dated Aug. 6, 2008 from U.S. Appl. No. 10/726,895.
Wickelgren, IJ, "The Facts About Firewire," IEEE Spectrum, IEEE Inc., New York, US, vol. 34, No. 4, Apr. 1997, pp. 19-25, XP002051393, ISSN: 0018-9235.
Kobayashi, "DisplayPort Technical Overview," http://web.archive.org/web/20060726222849/http://gnss.com/technology/DisplayPort+Technical+Overview+White+Paper.pdf, Jun. 26, 2006.
Silicon Image, "High-bandwidth Digital Content Protection," White Paper, Feb. 2000, retrieved from the Internet at http://www.siliconimage.com/docs/SiI-WP-002-A.pdf.
Sung et al., "DVI: A standard for the digital monitor interface," Silicon Image, Inc., Cupertino, CA, 1999, 4 pgs.
High-Definition Multimedia Interface Specification, Informational Version 1.0, Sep. 4, 2003, 52 pgs.
International Search Report in related Chinese Application No. 200410044503.5 dated Jun. 29, 2007.
"CLUT," http://en.wikipedia.org/wiki/CLUT.
"Packet," http://en.wikipedia.org/wiki/Packet.
Bloks, RHJ, "The IEEE—1934 high speed serial bus," Philips Journal of Research, Elsevier, Amsterdam, NL, vol. 50, No. 1, 1996, pp. 209-216, XP004008212 ISSN: 0165-5817.
Chang et al., "Digital Visual Interface," Technology Brief, Dell, May 2000.
Eidson et al., "30.2: IIDMI: High-Definition Multimedia Interface," Silicon Image, Inc., Sunnyvale, CA, SID 03 Digest, 2003, pp. 1024-1027.
"Digital Visual Interface (DVI), Revision 1.0," Apr. 2, 1999, http://wwwddwg.org/lib/dvi_10.pdf, Figures 2-1, 3-1, 4-1; sections 1.32, 2.1, 2.2.5, 2.6, 3.1.4, 3.3, 4.1; pp. 8, 10, 14-15, 23-25, 30-31, 33-34.
Office Action mailed Aug. 5, 2005 from U.S. Appl. No. 10/726,934.
Office Action mailed Aug. 9, 2005 from U.S. Appl. No. 10/726,438.
Office Action mailed Aug. 9, 2005 from U.S. Appl. No. 10/727,131.
Office Action mailed Nov. 1, 2005 from U.S. Appl. No. 10/726,438.
Office Action mailed Nov. 1, 2005 from U.S. Appl. No. 10/727,131.
Office Action mailed Nov. 2, 2005 from U.S. Appl. No. 10/726,802.
International Search Report dated Jun. 14, 2006 from European Patent Application No. 04252055.1.
Examination Report dated Jul. 5, 2006 from European Patent Application No. 04255611.8.
Examination Report dated Nov. 13, 2006 from European Patent Application No. 04255609.2.
Office Action mailed Dec. 5, 2006 from U.S. Appl. No. 10/726,802.
VESA Display Port Standard, Version 1.1, Mar. 19, 2007.
Office Action mailed Jun. 26, 2007 from U.S. Appl. No. 10/762,680.
EPO Exam Report in EP Application No. 04255786.8 dated Jul. 5, 2007.
Final Rejection mailed Sep. 21, 2007 from U.S. Appl. No. 10/909,103.
Notice of Allowance mailed Sep. 24, 2007 in U.S. Appl. No. 10/726,802.
Office Action dated Nov. 2, 2007 from Chinese Patent Application No. 2004100950502.4.
Supplemental Notice of Allowance mailed Nov. 6, 2007 in U.S. Appl. No. 10/726,802.
Office Action mailed Nov. 26, 2007 from U.S. Appl. No. 10/909,027.
Office Action dated Jan. 8, 2008 in U.S. Appl. No. 10/762,680.
Office Action dated Jan. 23, 2008 from U.S. Appl. No. 11/747,839.
Notice of Allowance dated Jan. 29, 2008 in U.S. Appl. No. 10/726,802.

(56) References Cited

OTHER PUBLICATIONS

Notice of Allowance dated Mar. 5, 2008 in U.S. Appl. No. 10/909,103.
Austrian Search Report dated Mar. 7, 2008 from Singapore Application No. 200401969-1.
Austrian Examination Report dated Mar. 7, 2008 from Singapore Application No. 200401969-1.
European Search Report dated Mar. 13, 2008 in EP Application No. 04251582.5.
European Search Report dated Mar. 13, 2008 in EP Application No. 04252056.9.
European Search Report dated Mar. 18, 2008 from EP Application No. 04252202.9.
European Search Report dated Mar. 28, 2008 in EP Application No. 04252054.4.
Chinese Office Action dated Mar. 28, 2008 in Chinese application No. 200410044503.5.
European Search Report dated Mar. 28, 2008 from EP Application No. 04252203.7.
European Search Report dated Mar. 28, 2008 from EP Application No. 04252057.7.
European Search Report dated Apr. 3, 2008 from EP Application No. 04252205.2.7.
Chinese Office Action dated Apr. 4, 2008 in Chinese Application No. 200410047784.X.
Office Action dated Apr. 9, 2008 from U.S. Appl. No. 10/909,027.
Notice of Allowance dated Apr. 25, 2008 from U.S. Appl. No. 10/726,802.
Office Action dated May 23, 2008 from Chinese Patent Application No. 200410071498.7.
Examination Report dated Jun. 5, 2008 from European Patent Application No. 04252057.7.
Examination Report dated Jun. 5, 2008 from European Patent Application No. 04251581.7.
Examination Report dated Jun. 5, 2008 from European Patent Application No. 04252202.9.
Examination Report dated Jun. 5, 2008 from European Patent Application No. 04252056.9.
Examination Report dated Jun. 5, 2008 from European Patent Application No. 04252054.4.
Examination Report dated Jun. 5, 2008 from European Patent Application No. 04252203.7.
Office Action dated Jun. 23, 2008 from U.S. Appl. No. 10/762,680.
Chinese Office Action dated Jun. 27, 2008 from Chinese Patent Application No. 200410038432.8.
Chinese Office Action dated Jun. 27, 2008 in Chinese Application No. 200410038546.2.
Office Action dated Jun. 27, 2008 from U.S. Appl. No. 10/909,085.
Search Report dated Jun. 30, 2008 in EP Application No. 08155262.2.
Search Report dated Jul. 2, 2008 in EP Application No. 08155263.0.
Office Action dated Jul. 2, 2008 from European Patent Application No. 04252205.2.
Office Action dated Jul. 4, 2008 from Chinese Patent Application No. 200410038545.8.
Search Report dated Jul. 10, 2008 from European Patent Application No. 08153726.8.
Search Report dated Jul. 21, 2008 from European Patent Application No. 08153724.3.
Office Action dated Aug. 1, 2008 in U.S. Appl. No. 10/909,027.
Office Action dated Aug. 8, 2008 from Chinese Patent Application No. 200410045686.2.
Office Action dated Aug. 8, 2008 from Chinese Patent Application No. 200410087460.9.
Office Action dated Aug. 19, 2008 from U.S. Appl. No. 10/726,440.
Office Action dated Aug. 29, 2008 from U.S. Appl. No. 11/742,387.
Notice of Allowance dated Oct. 1, 2008 in U.S. Appl. No. 10/909,085.
Office Action dated Oct. 16, 2008 in U.S. Appl. No. 10/909,027.
Notice of Allowance dated Oct. 21, 2008 in U.S. Appl. No. 10/762,680.
Kasai N et al., "Digital Packet Video Link 1-9 for Super High Resolution Display," IEICE Transactions on Electronics, Electronics Society, Tokyo, JP, vol. E84-C, No. 11, Nov. 2001, pp. 1630-1636, XP001110772, ISSN: 0916-8524, paragraphs 0001, 0002.
High-bandwidth Digital Content Protection System, Revision 1.0, Intel Corporation, Feb. 17, 2000.
Jun Hanari and Manabu Watanabe et al., "15.2: Development of an UXGA Display System by a Digital Packet Video Link," SID 01 Digest, vol. XXXII, Jun. 5, 2001, pp. 210-213, XP007007646, paragraphs 0001-0003.
U.S. Appl. No. 61/177,962, filed May 13, 2009.

\* cited by examiner

DEVICE, SYSTEM, AND METHOD FOR WIDE GAMUT COLOR SPACE SUPPORT

CROSS-REFERENCE TO RELATED APPLICATIONS

This patent application claims the benefit of priority under 35 U.S.C. 119(e) to U.S. Provisional Patent Application Ser. No. 61/177,962 filed May 13, 2009 and entitled "Multiple Device Color Gamut Management Method" which is hereby incorporated by reference herein for all purposes.

TECHNICAL FIELD

The present invention relates generally to image data transfer between source devices (e.g., multi-media source devices) and sink devices (e.g., image and video display devices such as monitors and other devices). In particular, the inventive technologies contemplate the ability to fully capitalize on the wide color gamut technologies coming into greater usage. The inventive technology seeks enable the capture, transmission, conversion, and display of image data across a wide range of differing wide gamut formats as well as existing formats.

BACKGROUND OF THE INVENTION

The present invention includes methods, devices, and systems suited to the receiving and transmitting of wide color gamut image and video data. Such data can be transmitted between devices of a multi-media network. Such networks can include audio-video source devices (example audio-video source devices including, but not limited to, cameras, video recorders, set-top boxes, DVD players, Blu-ray Disc players, personal computers (PCs), video game consoles (e.g., PlayStation 3, Wii, and Xbox 360, etc.)) and audio-video sink devices (examples including digital audio-video devices, computer monitors, digital televisions, convertor boxes, display devices, and AV receivers of many different varieties).

One of the current issues in the communication of color data is the sheer number of existing color formats, color spaces, and color gamut's used to generate, transmit, and display image data. In many such formats there is very little commonality between the formats. Accordingly, conversions must be made between the formats to render the resultant images in a faithful manner. In many cases, due to the many inherent difficulties in converting between formats (for example, the various HD and SD formats), the conversion is simply not performed at all. This results in a wide range of distortions and deviations from the intended color gamut resulting in a significantly distorted image as finally displayed.

The inventors point out that the use of standardized formats (examples including, but not limited to, sRGB, scRGB, an Adobe RGB, DCI-P3, SMPTE-C, ITU_R.BT601 (CCIR601), ITU_R.BT709, xvYCC, and grey-scale formats, as well as others) results in compromises in color fidelity. For example, each device has its own range of color capability defining a unique color gamut for that device. For example, a video recording device or other image capture device has a certain range of sensitivity to color and brightness that is generally unique to that device. This is represented as a "native" color gamut for such a device. One problem with the standardized color formats is that they have a defined color range over which the device can operate. This range will impose limits on the devices and resultant image fidelity where the standard format does not coincide with the native format of the device (in nearly 100% of cases).

Using FIG. 1(a) as an example, a simplified depiction of a number of different color spaces is shown. Here, a graph 100 figuratively represents a chromaticity diagram showing a CIE 1931 color space 111, an sRGB color space 101, and a wide color gamut space scRGB 112. Additionally, a "native" image capture color gamut 102 for an example image capture device (such as a camera) is depicted in dashed line. It is to be noted that certain regions 103 of the native color gamut 102 cannot be represented by the sRGB color space. Accordingly, distortions occur when the image data captured by the image capture device is encoded. Commonly, areas like that of 103 are simply lost in the conversion to a standard format.

In addition, referring to FIG. 1(b), when a captured image is displayed on a monitor having a smaller color gamut than that represented by the input data (i.e., the input data can defines a range of color and brightness beyond the capabilities of the monitor) an out of gamut problem will occur for those colors having no analog in the color space of the display device. For example, display gamut 111 is not able to display the full color range of an input image 112. The portions of the image 112 not realizable using a display with color gamut 111 are "out of gamut" 113. Numerous approaches for dealing with this problem can be used. In one common mode, out of gamut clipping will occur and the regions 113 are merely "clipped" from the image data and represented by some color at the edge of the color space 111. It can easily be seen that many conversions to standard formats (for example, sRGB) result in lost data and the inability to capture the full color gamut of an originating device. Thus, a first level of distortion is introduced into the image data. However, for many purposes, clipping and other color distortions associated with mapping to a standardized format are acceptable.

Additionally, image data encoded in one format may not be able to take full advantage of the large color gamut's available from modern sink devices. In such cases portions of the display gamut extend beyond a standard color space (e.g., an sRGB color space). Accordingly, the expanded color gamut available in a wide gamut sink device (e.g. a display) cannot be exploited by merely displaying an ordinary sRGB encoded image signal. In some cases, a reference gamut can be used to map image data to a wider gamut. For example, sRGB data can be mapped to a wider gamut format, such as an scRGB to obtain an expanded color gamut for display. However, due to peculiarities of the mapping algorithms, distortions also occur when the image data is mapped in this way. Moreover, there is no guarantee that the mapped data will look anything like the original data captured with an originating image capture device.

Thus, even though existing color formats are useful for many purposes, they lack the ability to take full advantage of the color capability of modern display and image content generation devices. Additionally, existing formats do not have the ability to adapt to the myriad of different color gamut's available in modern multi-media device (e.g., AV (audio-video) devices). There are many situations where higher colorimetric range and/or fidelity are desirable. There are also situations where a system needs to be flexible enough to capture many different color gamut's such as are present in the vast array of devices available today. The present invention addresses these concerns and provides methods and devices capable of providing enhanced color gamut support with relatively low system overhead. In facilitating this invention, the inventors have conceived of methods and devices that enable the transmission and receipt of color image and video data between devices. Importantly, the approach disclosed by the inventors has a number of desirable features. For one, the approaches discussed here feature wide color gamut support, a flexible and adaptable approach, and a relatively small amount of data overhead. These and other features of the inventions are highly useful and are described herein.

SUMMARY OF THE INVENTION

In a first aspect, the invention describes an integrated circuit chip having an image capture system. The system having a native color gamut associated with the capabilities of the system and processing circuitry for encoding the captured image data in an image data format that captures the native color gamut of the image capture using a simple color profile. The simple profile suitable for describing the native color gamut of the image capture system using a small set of parameters sufficient to enable decoding of said formatted image data.

In another aspect the invention comprises an integrated circuit chip configured for use in a multimedia source device. Such a chip includes a content processing system that receives input image data, determines the format of the image data, receives color gamut support capability information from a sink device, and transmits output image data to the sink wherein the output is encoded in a first input format or a second format. The chip further including a decision module that determines the format of the output image data and a mapping module for the selective mapping of image data from the first color gamut to the second color gamut.

In another aspect, an integrated circuit chip for use in a sink device is disclosed. The chip for supplying color gamut support capability information to a source device, the gamut support capability information describing color gamut display characteristics for a display media associated with the chip. Also a pair of interfaces enable communication between the chip and a source device to enable transmission of the gamut support information to the source device and to receive input image data from said source. Another interface can be used to enable communication between the chip and the display media to enable output image data to be transmitted to the display media.

A further aspect of the invention includes a method for communicating image data between source and sink devices in a multimedia network. The method comprises providing image data to a multi-media source device. This "providing" can comprise generating the data by the source or receiving previously encoded data from elsewhere. The encoded format of the image data is determined after a determination of the gamut support capability of the sink device is made. A determination is made as to whether the format of the input data is to be modified to a second format suitable for use by the sink device. In the case where modification is not needed, the data is forwarded to the sink without modification. Where modification is desired, a determination is made as to whether the modification is performed by said source device or by said sink device and then the modification is performed at the appropriate location. The data can also be displayed at the sink if desired. This method can be further implemented in a processing device or set of processing devices as a computer readable set of instructions.

The invention further encompasses novel data structures used to facilitate image data transmission and modification accommodating the color gamut support capabilities of a system. Such structures can comprise messages sent from sink devices to source devices describing the gamut support capabilities of the sink devices and can comprise image data headers which specify the encoding format of the image data. In particular, some embodiments capture a simple color profile for the image data or the sink device.

General aspects of the invention include, but are not limited to integrated circuits, chip systems, methods, systems, apparatus, and computer program products for enabling the transmission of gamut support capability information and the use of that information to enable high fidelity representation of image data having different color gamut than that of a displaying sink device.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention relates generally to the transmission and rendering of multimedia color image data between multimedia devices including audio-video (AV) source and sink devices. Such invention includes the chip systems, circuit apparatus, software, and devices configured to enable the same. More particularly, methods and chip systems are described for enabling wide gamut color data transmission from an AV source to an AV sink device such that the color information can be displayed with a desired level of fidelity.

In the following description, numerous specific details are set forth to provide a thorough understanding of the present invention. It will be apparent, however, to one skilled in the art that the present invention may be practiced without some or all of these specific details. In other instances, well known process steps have not been described in detail in order to avoid unnecessary obscuring of the present invention.

Figure 1A:
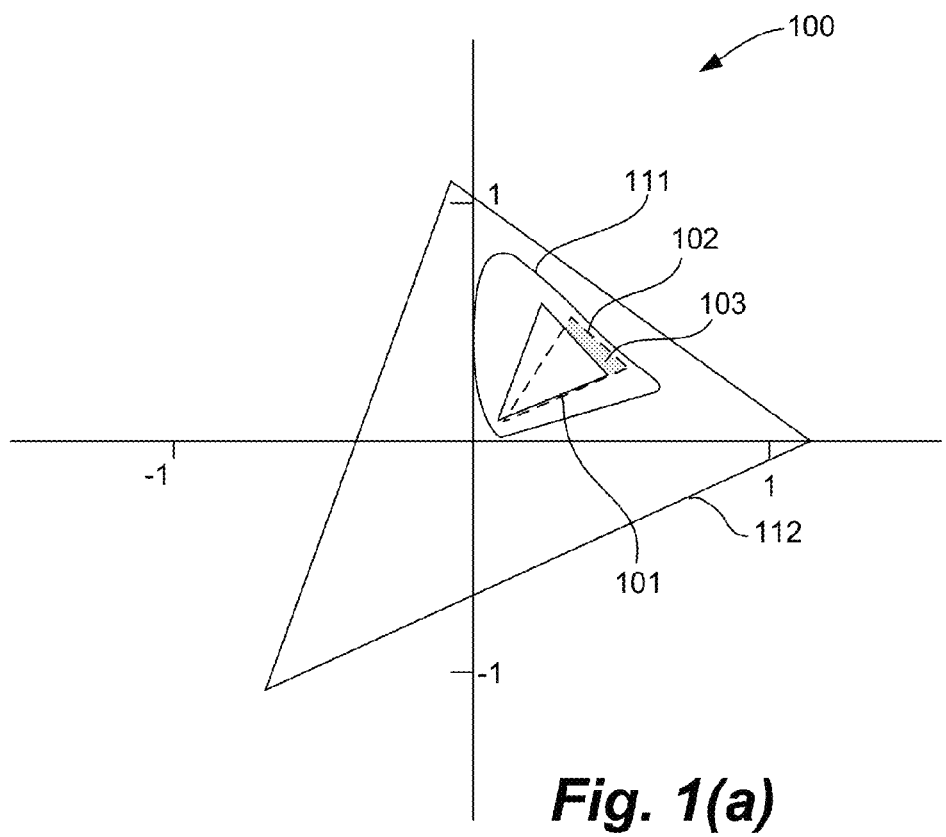
FIGS. 1(a) and 1(b) are graphical depictions of a number of different color spaces and gamut's associated with various standards and AV devices.
Figure 1B:
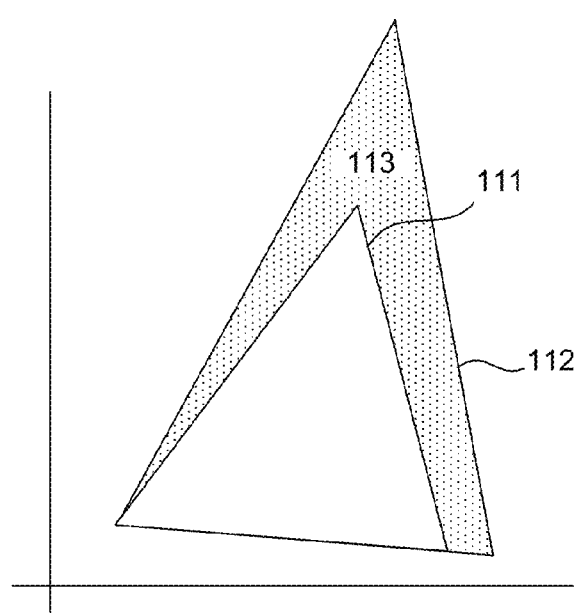
Figure 2:
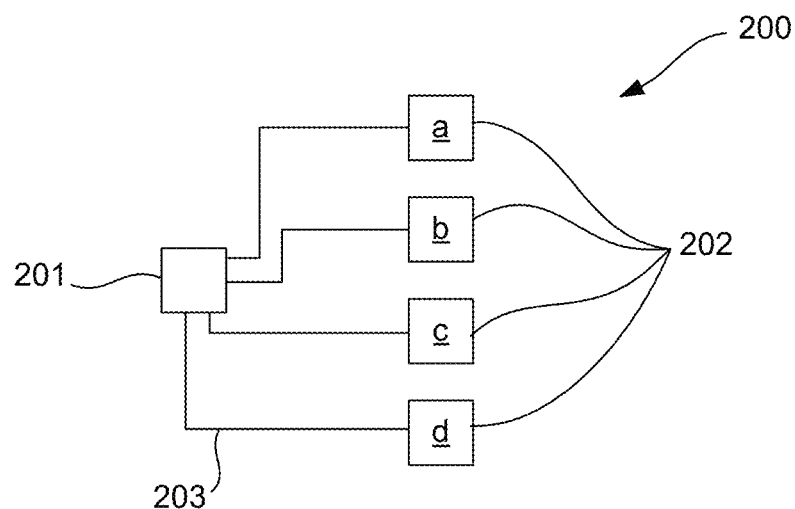
FIG. 2 is a simplified depiction of an AV network having source and sink devices.

With brief reference to FIG. 2, an example AV network 200 is depicted. This can include one or more AV source devices networked together in a larger system that typically includes at least AV one sink device. In the example network an AV source device 201 is interconnected 203 with a number of different AV sink devices 202.

As briefly stated above, sources 201 may include, but are not limited to any suitable video, audio, and/or data source devices including a desktop computers, portable computers, DVD players, Blu-ray players, set-top boxes or video graphics cards, among a myriad of other multi-media content transmitting devices. The inventors point out that the source devices 201 can be connected with stand apart content generation devices or, alternatively, the content generation devices can form an integral part of the source device. One typical example of such content generators includes image capture devices (e.g., cameras or video recorders) as well as other types of image and video content generating devices. A wide range of sink devices can also be employed including, but not limited to CRT's, plasma devices, penetron devices, LCD devices, LED devices, as well as many others known in the art and integrated into display devices or other sink type devices. Sink device is intended to be interpreted broadly, for example, a computer device arranged to receive signal from a source device can be employed as a sink device.

These devices are connected together using wired 203 or wireless connectors. Such connectors include the ability to transmit image data as well as transmit configuration data between the devices to establish correctly configured devices. Typically but not exclusively, auxiliary lines transmit such configuration data.

Again referring to FIG. 2, the inventors point to an example where the devices are configured to support image data having one or more color gamut's. For example, in a first idealized situation the source 201 is configured to transmit source image data encoded in a first color format (e.g., sRGB) and each of the sink devices 202a, 202b, 202c, 202d are also configured to receive the same data format. This is a situation free of complexity and requires no special consideration. In another example, the source 201 is again configured to transmit source image data encoded in a first color format (e.g., sRGB) and the sink devices are configured to receive data arranged in different formats. Where, for example, sinks 202a, 202b, 202c, 202d are each configured to support image data in a second color format (e.g., Adobe RGB format) there will be some degree of distortion when the initial signal (in sRGB) is sent to the sink devices. This is the current situation when the sRGB signal is sent to the sinks. Due to the incongruence of format there will be some distortion of the signal when displayed. Thus, no two monitors really display the same image data the same way.

The inventors propose a methodology for improving color fidelity in this and other situations. In one situation, a determination of sink color gamut support is determined and then an image signal that is compatible (or is made compatible) with the sink color gamut color support capability is provided to the sink device. For example, in one situation, a modification (e.g., a mapping) can be performed that alters the image data from the first format (e.g., sRGB) to the second format (e.g., Adobe RGB) that is supported by the sink. In this simple situation, it may be advantageous to conduct the modification at the source device 201 and then transmit the modified image data to the sink devices. This can be advantageous because, generally, the source device has a great deal of computing power (e.g., using graphics cards, specialized IC chips, and the like) compared to sink devices enabling such modification to be done quickly and efficiently. However, there are disadvantages in such a scheme. For example, in the case where each (or at least some) of the sink devices operate using different color formats this puts a considerable burden on the processing resources of a source device. In one example case, only 202a supports the first format (e.g., sRGB), whereas 202b supports a second format (e.g., Adobe RGB), 202c supports a third format (e.g., encoded in a YCC color space), and where 202d supports a fourth format (e.g., ITU.R.BT709). In such a situation, if simultaneous signal is to be sent to more than one sink, performing all the modification at the source can provide a serious bottleneck to the data transmission. In such a case, it would be advantageous to perform the data modification at each sink individually. Unfortunately, there is no satisfactory support mechanism for such a process currently available in the art.

Additionally, as indicated above, none of the existing standard color spaces are customized to the particular needs of specific sink and source devices. In most cases, the standard formats and color spaces do not capture the full color gamut's or operational ranges of AV devices. Moreover, conversion between such color spaces is fraught with distortion. The present invention provides a mechanism for altering image data generated in accord with the color space of one device to a be displayable using the color space of another device with a minimal distortion and minimized loss of color fidelity. Moreover, the inventive approach does so with a great deal of flexibility and adaptability. Also, the inventive approach requires minimal data overhead to operate, requiring only small descriptors to describe device gamut support capability and small data headers.

An invention as presently described, can operate upon a number of different encoding schemes and color profiles. Examples include such as sRGB, scRGB, xYCC, AdobeRGB, and a wide range of other standard color spaces and gamut's. Such standard schemes expressly include wide gamut color spaces to include but not limited to reference color gamut's. Additionally, the disclosed approach is inclusive, enabling operation using very detailed color profiles such as those specified using an ICC color profile.

However, the invention also describes and can employ a highly flexible and simplified data profile to encode color image data. As described hereinafter, this data profile is referred to as a "simple" profile. In one embodiment, the simple profile comprises a three channel data profile that is used to encode color image data (which can also be used to specify gray scale). The simple profile is far more compact than an ICC profile (which can and typically requires megabytes of data to specify) while still containing the most relevant detail. Additionally, it is very flexible, covering virtual all color gamut's likely to be employed using modern multimedia devices. Accordingly, the simple profile is simple, adaptable, small, operable with low data overhead and enables the capture, generation, transmission, and modification of color data, to include, wide color gamut data. In particular, it can be used to describe and encode data in a manner that is representative of device that will capture, generate, or display the data. Such a profile being especially suited to capturing a unique native color gamut of a multimedia device (e.g., a video camera color gamut). Similarly, the simple profile can be used to characterize the display properties of a sink device which receives the encoded data. This enables the data obtained in one format to flexibly adapt to the display color gamut of a sink device. Moreover, this approach can conduct data encoding using a small and relatively compact color profile. Simple profiles, in their entirety can be specified in a matter of a few bytes, whereas, for comparison, the header of an ICC profile requires 128 bytes, let alone the long string of data required to specify the entire profile. Thus, the simple profile is far smaller than the large ICC profiles and with far greater range and flexibility than standard format color encoding. Thus, for at least these reasons the "simple" profile has great utility.

Figure 3A:
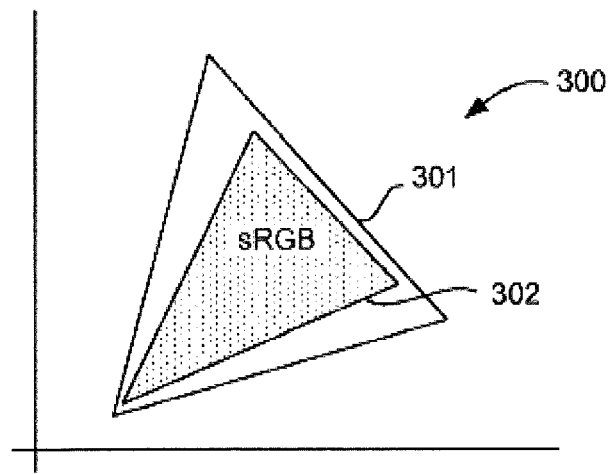
FIGS. 3(a)-3(b) are graphic depictions of selected color spaces and simple profiles used to characterize AV devices.

One example of a simple profile is illustrated with respect to FIG. 3(a). An x-y diagram 300 illustrating chromaticity depicts a device color gamut and an example standard color gamut. The diagram depicts a color gamut 301 for an example originating device. Also, a standard color gamut (here, for example, an sRGB gamut) 302 is shown for comparison. As explained above and readily visible here, the sRGB gamut does not encompass the full native color gamut of the originating device.

In order to accommodate the differences between color gamut's the inventors contemplate a simple color profile suitable for enabling color gamut information associated with the originating device to be supported on a number of different devices using a relatively small amount of processing overhead. Further, the inventors contemplate that the simple color profile is suitable for characterizing the color gamut associated with a display device.

Figure 3B:
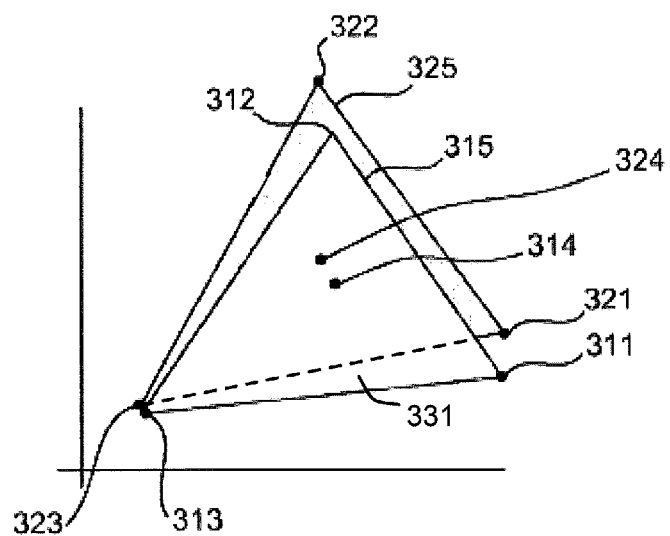

Such a simple profile is a parametric color profile that is specified using a relatively small number of parameters. Such a simple profile includes a number of parameters that characterize one of: (a) a native color gamut of a device that creates image data or (b) that characterize a color gamut of a display device or other sink that will display image data. In one example, FIG. 3(b) depicts a pair of color gamut's and their relationship which can be used to determine gamut support of the various devices involved. In one embodiment, data generated or otherwise captured by a content generation device can specify the native color gamut 315 as follows. Parameters for a red point 311 of the native color gamut of the originating device can be specified simply. Merely an x and y chromaticity coordinate in any suitable color space (e.g., using a RGB color coordinate space) can be used. In this depicted example, red has an x value of 0.6 and y value of 0.15. The inventors point out that this depiction is but one example with a vast array of possible variations. Similarly, in this example, each of the green 312 and blue 313 parameters can be specified with their associated coordinates. Also, a white point 314 parameter can be specified using, for example, x,y coordinates and a luminance value. Additionally, ranges and scaling can be specified to establish the resolution of the data in accordance with the resolution of the encoding. For example, if color is to be encoded in a single byte (having 8 bit resolution), the color range is specified and has a resolution in accord with a range of eight bits i.e., 0-255. Additionally a reference must be specified to indicate the zero bias and unit scale for the signal. Thus, the range, resolution, zero bias and unit scale are encoded into the simple profile. More commonly, the image data is encoded having greater resolution. One example being 10 bit encoding, the digital code range is from 0 to 1023, assuming zero bias is 384 and unit scale is 510, thus the minimum and maximum range can be derived as [(0-384)/510, (1023-384)/510], that is, [−0.7529, 1.2529]. Different bias or digital unit scale may be adopted by different systems or devices.

The inventors point out that further parameters can be used to more fully specify the color of the image data. For example, a gamma parameter can be used. Or alternatively, to obtain better fidelity a number of different gamma response parameters can be specified to model non-linear gamma performance. Thus, in a simple example, the gamma parameter can be a single linear value (e.g., 2.2) or it can be specified by a series of parameters to capture a desired non-linear gamma response. In one example, parameters $A_0, A_1, A_2, A_3$, could be used to specify a series of ranges each with an associated gamma function that operates within the proscribed ranges to model non-linear gamma response. In one implementation, a gamma response from a non-linear input signal L' to a linear output signal L mapping a non-linear r'g'b' to a linear rgb can be characterized as follows. For example, a non-linear gamma response can be used to enhance mid-tones. In a case where $A_0$-$A_3$ are positive, if $0 \le |L'| \le A_0$, then $L = L'/A_1$;

if $L' > A_0$, then $L = [(L' + A_2)/(1 + A_2)]^{A_3}$ if $L' < -A_0$, then $L = -[(L' - A_2)/(-1 - A_2)]^{A_3}$ Many other gamma relations (such mapping from a linear encoding to a non-linear format suitable for display) and ranges will be known to those of ordinary skill in the art and can be optimized to correctly model each system or signal. These parameters can be used to specify the simple profile with an extremely small data overhead. For example, the entire profile can be specified in 20 bytes or less. This is in comparison to the massive ICC profiles where the header alone can comprise 128 bytes. Using such a profile, image data can be encoded using, for example, 16 bit logic to contain an extremely high fidelity color signal.

In comparison, a display device profile gamut 325 can be specified using the same set of parameters. As shown by example in FIG. 3(b), an example display profile gamut 325 includes a similar set of parameters including a red 321, green 322, blue 323 reference for the native color gamut of the display. As before, x and y coordinates are specified as are a white point 324 parameter can be specified using, for example, x,y coordinates and a luminance value. Additionally, ranges and scaling can be specified to establish the resolution of the display in accordance with the resolution of the encoding. Additionally zero bias reference for the scaling is specified, as is the gamma response for the device.

As can be seen here, the image color space 315 and the display gamut 325 are not identical. Moreover, in this example, the image color space 315 does not lie entirely within the display gamut 325. In a case where the image color space 315 is entirely within the color gamut of the display (325) then the image can be displayed without modification. In such a simple situation, the simple profile is an excellent method of representing data and also an easy way of representing the image data using the display color gamut. However, as displayed here, the two gamuts are not consonant with one another. This means that some modification of the image data will be required to provide a displayed image having reasonable fidelity to the original. A number of data treatments, mappings, or modifications can be employed to serve this need. In one approach, the data can be modified (mapped) by merely "clipping" the "out-of-gamut" color data 331. This can be achieved in accord with any of a number of different clipping algorithms known to those of ordinary skill in the art. In another common approach, a contraction algorithm can be used to "shrink" the image color space 315 such that it entirely (or partially) fits within the color gamut 325 of the display device. As can be appreciated by those of ordinary skill many other renderings of the data can be used in accordance with the principles of the invention. Similarly, it is appreciated by those of ordinary skill that these approaches result in some degree of distortion and require some image modification software resident at one of the source or sink devices. Thus, the simple profile can be used to describe image data color profiles as well as display characteristics and accordingly provide color gamut support capability information that can be used by embodiments of the invention.

Figure 4A:
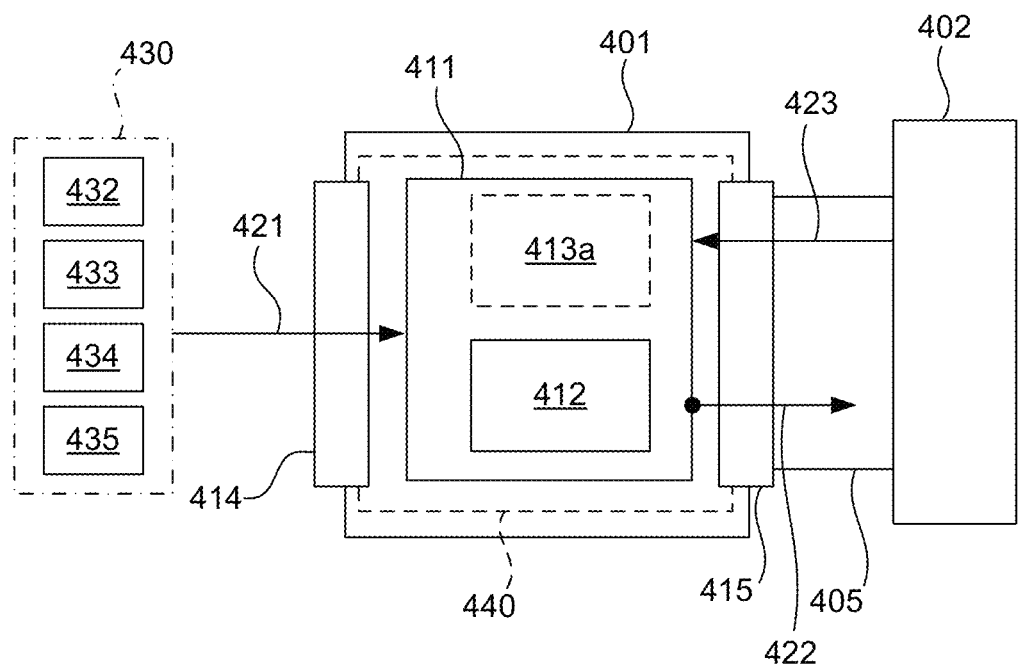
FIGS. 4(a)-4(b) are various schematic depictions of selected AV network embodiments showing source and sink devices and some of their sub-components.
Figure 4B:
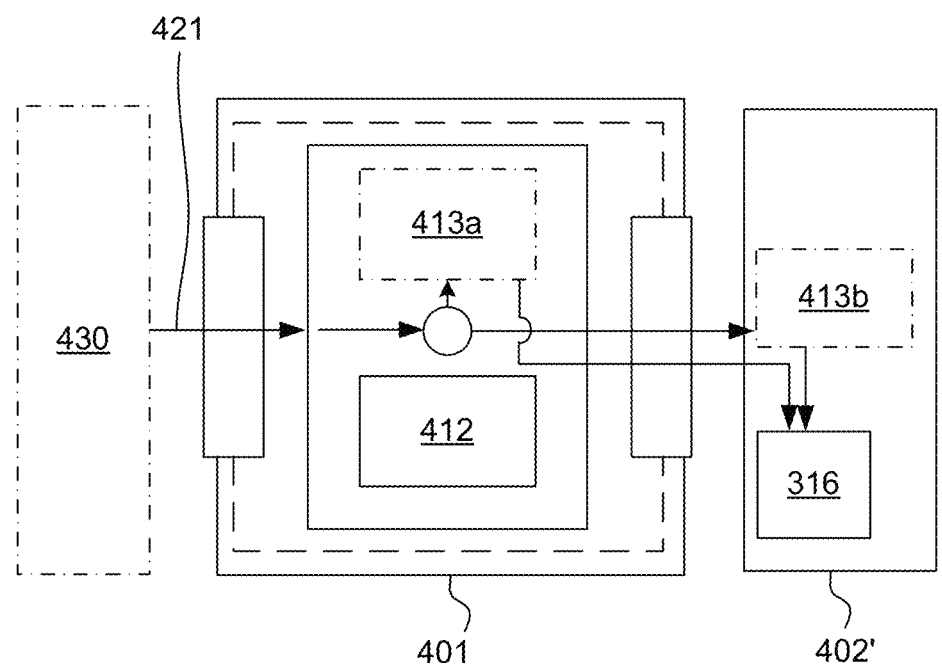

One approach suitable for implementing the invention is described with respect to FIGS. 4(a) & 4(b). Here figuratively described multi-media source devices 401 (including their associated processing circuitry and integrated circuit chips) are arranged in communication with a figuratively described multi-media sink device 402 (including their associated processing circuitry and integrated circuit chips). Each pair is linked with a connector 405 that facilitates communication between the source 401 and the sink 402. Such connectors 405 can be wired or wireless connectors. The connector is capable of transmitting color image data and also capable of establishing auxiliary communication between the devices to transmit and receive ancillary information. Importantly, the connector can communicate gamut support capability information between devices.

The embodiments depicted in FIGS. 4(a) and 4(b) are different, but related device architectures that enable various embodiments of the invention as well as various combinations thereof and other configurations.

In one embodiment, depicted in FIG. 4(a), a source device 401 includes a content processing system 411 that enables the determination of the gamut support capability of the sink 402, the format of the image data 421, the determination of whether the image modification is to be performed, and determines where said modification will be performed. It should be noted that the system 411 is typically embodied in one or more integrated circuit chips. For example, the content processing system 411 can include a decision module 412. The decision module 412 can receive the input image data 421 and determine its encoding format. Additionally, the decision module 412 obtains color gamut support information 423 from the sink device 402. The color gamut support information 123 can be transmitted to the source 401 from the sink 402 using an auxiliary line of the connector 405 or another means.

In this embodiment, the content processing system 411 can further include a modification module 413a configured to modify the input image data 421 such that it attains a second format compatible with the gamut support capability of the sink device 402. For example, the input image data 421 can be clipped to a format presentable using the color gamut available at the sink 402. Examples of such modification can include clipping, trimming, dodging, burning and other data manipulations suitable for application to gamut mapping and modification. The inventors also contemplate that many other color modification and contrast algorithms and approaches can be used depending on the devices involved and the gamut support capabilities of the devices involved. So, in one example embodiment, modification involves adjusting the input image data 421 from a first color gamut (typically, the originating color gamut in which the data 421 is encoded) to a second color gamut that is compatible with the characteristics of the sink device 402. Thus, output image data 422 is transmitted to the sink device 402 in accord with a second color gamut that is compatible with the sink 402. Typical sink devices can include computers, televisions, displays, digital projectors, and the like.

In one implementation, the content that comprises the input data 421 is generated by a content generation system 430 (which can be hardware, software, or any combination thereof). This content generation device can comprise image generation devices (such as software designing to generate images and image streams, game consoles, DVD readers, and the entire array of image and video content generation devices) and can also include image and video image capture devices (e.g., cameras, video recorders, etc.) or other content generation devices and software. Specifically, such content generation devices are intended to be interpreted broadly such that they encompass other means of content generation. Examples including, but not limited to computer generated AV content, user created content, and so on. The content can include, but is not limited to a video stream or individual images.

Importantly, the content generation device 430 can form a separate device or, alternatively, can be an integrated part of the source device 401. As stated previously, the content generation device 430 can be an image capture device such as a video camera having an optical capture system 432 arranged to capture AV data. In one implementation this can be a lens system and associated image sensor devices (e.g., CCD or CMOS devices or other similar devices). The system can further include microprocessors 434 to operate and control the various systems and configured to encode data generated by, for example, the image capture system 432 or other content generation sources. In one implementation, content can be generated by a user employing a user interface 435 or by other means known to persons of ordinary skill in the art. The content generation device 430 can also include memory 433 for storing the encoded audio video data (e.g., image and video data). The memory 433 can also comprise removable memory. As stated previously, many other more generalized content generation devices are contemplated beyond that of image capture devices. Computers and game consoles provide further examples of approaches for generating AV content 421 contemplated by the inventors.

As stated generally above, the content generation device 430 generates image content 421 having a first format that is defined by a first color gamut. Generally, this first format is referred to as an originating format. For example, where the device 430 is a video camera, the data 421 is encoded using the attendant "native" color gamut of the video camera image capture chip and supporting software/hardware systems. In another case, where the device 430 is, for example, integral to a source device 401 (such as where the device 430 is a DVD reader that forms part of source 401), the initial format and color gamut of image data 421 is the color gamut of the recorded format which was used to encode the DVD being read.

In one example, a chip that supports the content processing circuitry 411 includes an input interface 414 and an output interface 415. It should be pointed out that the content generation circuitry 430 can be resident on the chip 440 or on the source device 401 as well as comprising a separate device. In one such embodiment, the content generation circuitry 430 can be arranged between the input 414 and content processing circuitry 411. However, generally the image content 421 is received at an input 414, processed using the content processing system 411 and then transmitted via output 415 to a sink device 402. Further details of how the invention captures a fuller range of color modification methodologies will be described in at a later point in this specification. As hinted at above, the content 421 can also have been captured at some time previously and stored on a memory media like a flash memory device or a DVD (or one of many other possible storage media).

A somewhat different but functionally related system is depicted in FIG. 4(b). The source device 401 includes a content processing system 411 having a decision module 412 that enables the determination of whether modification is to be performed and determines where said modification will be performed. The modification module 413a is optional. For example, the module may instead be resident on the sink device 402' as modification module 413b. So a module can be present on one or the other (401, 402), both, or neither. To continue, the content generation device 430 can be the same as described in FIG. 4(a) above. But, in the depicted example, a modification module 413b is resident on the sink device 402'. In such a case the module 413b can simply be a system on chip forming a part of the sink device 402' or integrated into the chip system of the sink device 402'.

Thus, in this example, both the source device 401 and the sink device 402' include modification modules. As before, the decision module 412 receives information concerning the format of received input image data 421. This information can be easily discerned and stored. In one common implementation, such format information can simply encoded into a data header for the image data 421 where it can be read by the source device 401. Additionally, the decision module 412 receives information concerning the color gamut support capability of the sink device 402'. As described above, in this embodiment, the sink device 402' includes the modification module 413b. This enables the sink to modify the input image data 421 into a second format compatible with the sink device 402'. Accordingly, where no modification module 413a is present in the source device 401 or where it is desirable to conduct a modification at the sink device 402', the modification can be performed (per decision of module 412) at the module 413b of sink device 402'.

Referring again to FIG. 4(b), a generalized approach to color gamut management can be described. For example, when a source 401 (or source chip) receives input data 421 configured having a first color format associated with a first color gamut (for example, the native format of the originating device) a modification decision can be made. This typically includes a determination of the format in which the input data is encoded, a determination as to what the gamut support capabilities of the source and sink devices are, a determination as to whether a modification of the input data to a second format shall be performed, and a determination as to where such a modification is to be performed. Thus, the following discussion outlines a process embodiment that describes a method by which input data 421 is received having a first format and generates output data 422 having a first format or second format compatible with the display capability of the sink device. Such output 422 can be received by a display media 316 of the sink device and/or output to further devices. These are made based on a variety of criteria that are described herein below.

Figure 5:
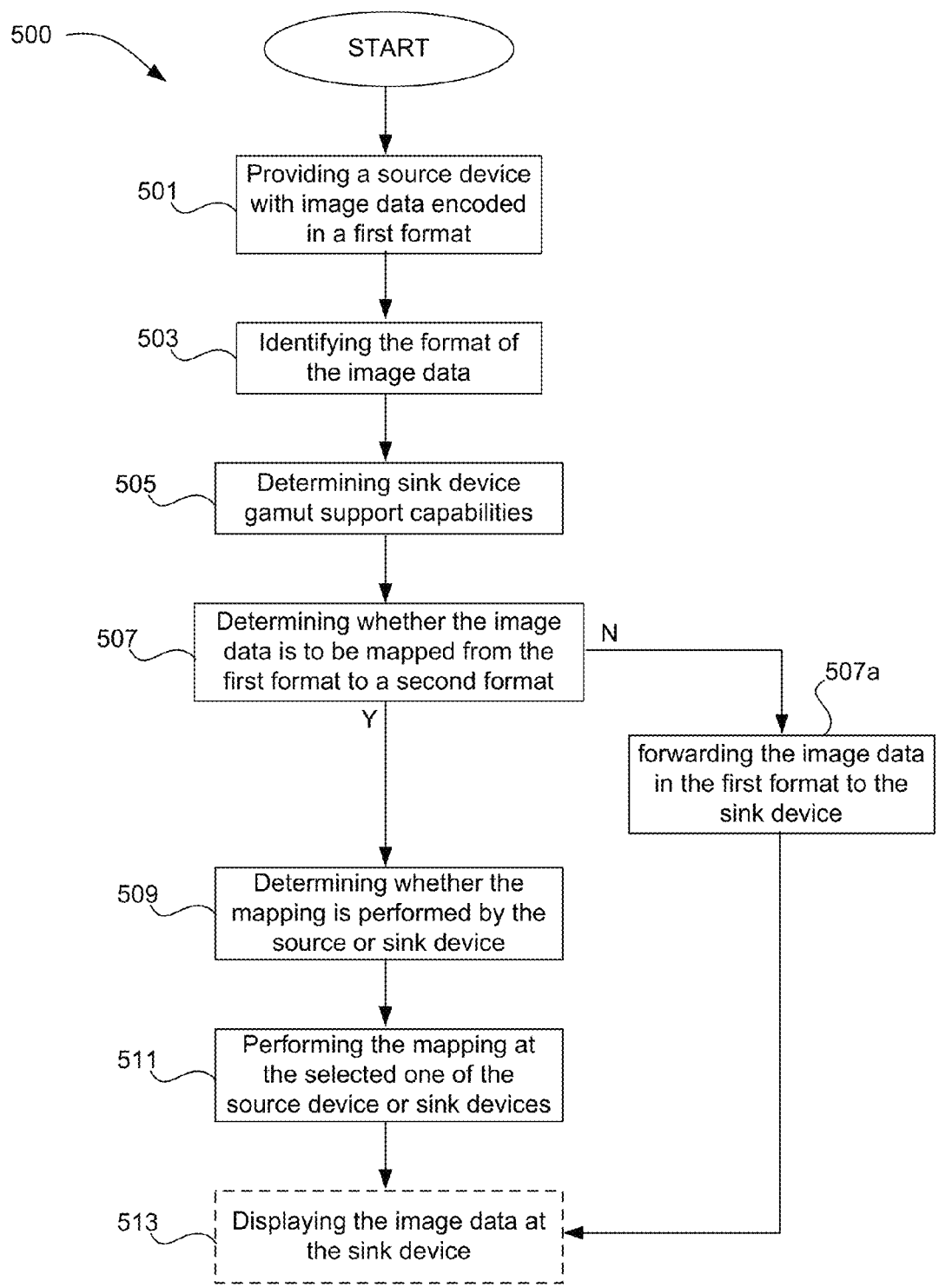
FIG. 5 is a flow diagram illustrating one embodiment of networked device operation in accordance with the principles of the invention.

The following discussion is a brief outline of an example process flow diagram 500 as illustrated by FIG. 5. The process flow explains one mode of gamut color support in a multi-media system comprising multi-media source and sink devices. This enables received image data encoded in a first format (typically encoded by an originating device) to be displayed in a second format that takes fuller advantage of display format capabilities of a sink device (e.g., a device having a display media). For multi-media sink device to display a color image signal with high fidelity the following process can be used. The initial color image signal is encoded in an originating format. For example, such format being associated with the device that generates the content (i.e., the initial color image signal). This signal can be generated in any one of a variety of ways. The important point is that the image data is received by the source or its attendant processing circuitry in a first format (Step 501). The encoding format used to encode the image data of the initial signal is identified (Step 503). A determination of gamut support capability for the sink device is also made (Step 505). This typically includes a determination as to whether the sink device can display the image data in its first format and a determination of the color modification and display capabilities of the sink device. A determination is made as to whether modification is desired or required of the image data of the initial signal (Step 507). In the case where it is deemed that no modification is required, the input image data can simply be forwarded to the sink device without further modification (Step 507a). Once forwarded, the sink can display this image data (Step 513) in the unmodified first format. However, in a case where the process determines that the initial signal (encoded in a first color format) is to be modified (mapped) to a second format supported by the sink device, a determination is made as to where the modification is to be performed, the source or the sink (Step 509). Once the process determines where said modification (e.g., mapping) is to be performed, said modification is conducted (Step 511) and then the modified signal can be displayed at the sink device (Step 513).

With continued reference to the flow diagram 500 of FIG. 5 (and also system diagrams of FIGS. 4(a)-4(b)), further explanation follows. A process can begin with the provision of input image data 421 (Step 501) which can be input into the source 401, 401' from another device or generated by a content generation device internal to the source device 401, 401'. The input data 421 can be encoded in any of a number of standard formats, an ICC color profile, or the simple color profile described above. The initial color image signal is encoded in an originating format (in one example, the originating format is a format associated with the device that generates the content) thereby providing an initial image signal. As indicated previously, this signal can be generated in any one of a variety of ways. It can be received from an origin exterior to the source device 401, 401' (or exterior to source circuitry), it can be generated by the source device itself, it can be obtained by accessing some stored image data (for example, it can be read from a DVD (or any other storage media) by the source device), or any of a number of other means.

In one representative example, the input data 421 is encoded in a first format associated with a first color gamut. For example, the first format can be a standard format native to the device creating the image data. Such format can be a generally accepted standard format (sRGB, scRGB, and so on) or an originating format that more fully describes the color gamut in which the image data is encoded. For example, a color gamut specifically associated with the image capture capability of an originating image capture device (e.g., a video camera). In some implementations the native format of the content generator is a standard format, but as stated above, the native format can comprise a more specific originating format that more accurately captures a color gamut of an image capture device capturing/generating the data. Also, the data can be encoded in another wider gamut standard format (e.g., a reference format such as scRGB which references from a standard sRGB format). Such referenced formats are also standard formats but can be generally thought of as enhanced gamut formats because they represent wider color gamut's, but still reference a smaller standard color gamut. A few representative standard format types (including wide gamut referenced formats) are listed to illustrate some suitable implementations. Illustrative examples include, but are not limited to sRGB, scRGB, an Adobe RGB, DCI-P3, ITU_R.BT601 (CCIR601), ITU_R.BT709, xvYCC, and many other standard formats.

Also, it is possible that the profile of the input image data can be encoded in accordance with an ICC profile (e.g., as specified in International Standard ISO 15076-1:2005) for the first format. However, as already explained, such ICC profiles have massive data overhead and very complicated color profiles (that can comprise many megabytes of data). Moreover, the ICC profile is complex (e.g., it specifies 16 channel resolution). This is in marked contrast to the "simple" profile disclosed below (which only requires three channel resolution). Additionally, it is worth pointing out that very few devices are capable of even supporting such an ICC profile. So, although the inventors contemplate that certain embodiments of the invention support such ICC profiles, other disclosed approaches may prove more suitable and useful. In particular the simple profile described herein defines a simple three channel encoding format that is very compact and easy to implement.

To continue with the discussion of the flow diagram, the encoding format of the received image data is then identified (Step 503). In accordance with the principles of the present invention, a data header for the image data can be made very compact. For example, rather than specifying standard format encoding in detail, the header can simply include a flag that indicates which of many different standard formats the data 421 is encoded in. This is very economic from a data overhead stand point as it lets system components (e.g., 401, 402, etc.) become aware of standard format data streams using less than a byte or two of data. In some cases, a flag can be used to indicate whether an ICC profile is used to encode the data stream requiring the full profile to be also specified. Additionally, in an example where the image data is encoded in a simple format, the parametric format, such as discussed above, can be specified in the header.

Additionally, the gamut support capability of the sink (Step 505) device is also determined. This information can be exchanged between a source (e.g., 401) and a sink (e.g., 402). For example, sink device gamut support capability information can be sent to the source using a simple message, sent through an auxiliary line of the connector 405. The message includes information that describes the color gamut support capability of other devices in a network of such devices. In one example, the sink can inform the source whether or not it has a color modification capability or not or inform of the formats that it can display. For example, the sink can inform the source whether or not it can support an ICC profile. Commonly, the sink informs the source what color gamut's it supports. For example, a small message (a descriptor) can be sent to the source identifying the gamut support properties of the sink. This descriptor can, for example, include flags to identify which standard formats the sink supports and an indicator that identifies what other formats it supports, for example, whether it supports ICC profiles or "simple" profiles of a type disclosed herein. In general, gamut support capability is a description of the display formats (color gamut's/spaces) that a sink device can display. Moreover, it can include modification capabilities of the sink that will enable the sink to receive input data that is encoded in a format different from that of the sink and modify, map, or otherwise convert the input data to data that can be presented by image media of the sink device. This information can be exchanged between source and sink devices and then can be used to determine whether a color modification can be performed at a sink device.

Once the gamut support capability of the various sink devices has been determined. The need for modification is determined (Step 507). If the initial image signal (e.g., 421) is encoded in a format supported by the sink device, then no modification is required. For example, if the input image data is encoded in a first format comprising, for example, sRGB and the sink device supports and can faithfully render sRGB signals, the input image data is forwarded to the sink device (Step 507a) where it can be displayed in its original format (Step 513). Such can also be the case where no suitable color modification capability is available at the source or sink. The unmodified input image data (encoded in its originating format) is transmitted to the sink device where it is displayed in its original format. This determination can be made, for example, at the decision module 412 of a source device 401.

To continue, once it is determined that a modification can be conducted, a determination is made as to where the modification is performed (Step 509). This determination can be made in accordance with a number of criteria or a combination of these criteria. A few examples are provided to illustrate various embodiments of the invention.

The location of the modification can be pre-specified. For example, all modification can be pre-designated as being conducted at the source. This can be desirable where there is only one sink device, or perhaps several sink devices, each configured to display images in accordance with the same color gamut. Thus a single mapping can be applicable to all of the networked sink devices. The drawback of this approach is that it places the entire processing burden on the modification modules (e.g., 413a) of the source device. The problem becomes acute when there is more than one sink receiving image data from the source at the same time and where the formats required for each sink are each different. This puts a lot of processing pressure on the source device which can bog the systems down and is therefore, generally, undesirable.

In another approach, the modification function can be distributed to each of the sink devices that can support such modification. For example, as depicted in FIG. 2, the sinks (202a, 202b, 202c, 202d) can, for example, be configured to display four different formats. In a situation where at least some of the sinks have color modification ability, the system can elect to have the modification be performed on the sink devices. In one embodiment, this determination is made by the decision module (e.g., 412 of FIG. 4) of the source 401. The module 412 can use the gamut support capability information (obtained in Step 505) from the associated sink devices to determine where the modification will occur. For example, the module 412 can determine that whether a desired modification capability exists at the sink, where such capability exists, the input data will be forwarded to sink for further processing and, commonly, display. For example, if the input image data is encoded in accord with a simple profile and it is determined that the sink device can operate on image data having a simple profile, the decision module determines that the input data is to be forwarded to the sink for further processing and display. Also, the module 412 can determine that a desired modification capability does not exist at the sink, wherein the input data must be modified at the source (to attain an appropriate format) and then, commonly, displayed. Image data to be operated upon without mapping can also be addressed similarly by the system. Typically, such data will be sent from source to sink where it is displayed in accordance with whatever manner said sink displays the input data. Thus, as in the present art, there can be some distortion in this mode.

Thus, once the determination as to whether mapping is to occur (Step 507) and where said mapping is to occur (Step 509), in the case where modification is required, the modification is performed (Step 511). As intimated above, the modification is then performed at a locus the system deems appropriate. In this way the input signal can be modified from an original format (e.g., from a native color gamut of the content generation device) to a second gamut supported by a sink device. Importantly, a determination as to which modification is to be used can be made. In other words a priority can be set. For example, if the sink supports two color spaces and neither perfectly matches the input signal a priority can be set which selects one format over the other and then the input is modified to compatibility with the selected color space. Additionally, circuitry can be used to determine which color space gets the best results from the input signal.

Once modified, the signal can be displayed or, alternatively, stored at the sink device (Step 513). Thus, in one example, an input signal comprising image data encoded using a first color gamut (e.g., encoded, for example, with a native color gamut for a video device that records the signal, e.g., as an sRGB signal) is modified, for example, at a data source (or alternatively at the sink) into a second format which comprises a second color gamut supported by the sink device (for example, an scRGB format). This signal could be displayed in said second format at a display media of the sink device. Alternatively, the image data of the second format can be stored at the sink or forwarded to a further location. In another example, an input signal comprising image data encoded in accordance with a first simple profile, is modified, for example, at the source into a second simple display profile that characterizes the color gamut support capabilities of the sink device. This simplified profile enables flexible description of color gamut's for various devices and the ready conversion between them.

The invention and the disclosed simple profile can take advantage of existing 8-bit color encoding as well as newer high resolution signals including 10-bit, 8B/10B, 16-bit, 18-bit, and other formats and resolutions. The disclosed invention is intended to be applicable to a wide range of devices that can define a very wide range of color gamuts.

Figure 6A:
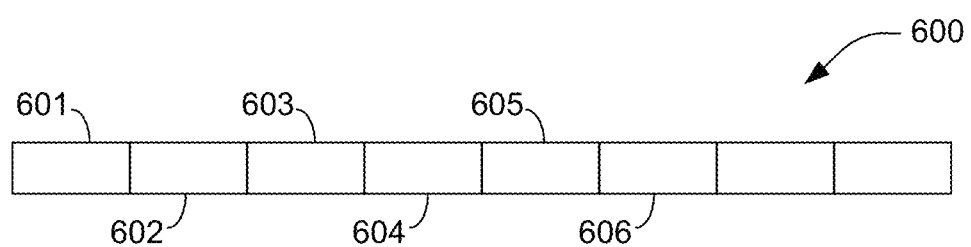
FIGS. 6(a) and 6(b) are simplified depictions of various color gamut support capability descriptors as used and described in accordance with the principles of the invention.

FIG. 6(a) illustrates one example of a header or message suitable for disclosing a gamut support capability in a system as described above. In general, the depicted embodiment illustrates three ways of specifying gamut support capability. The details can be specified by a header associated with image data. Additionally, a sink device can send to the source device a small message (e.g., using an auxiliary communication path). Such a message can be a gamut support capability descriptor 600. The example descriptor comprises a few bytes, but can be larger or smaller. A first bit 601 (bit zero) can be used to signify that the device capability provides no color support capability at all. So for example, a bit value of "0" can indicate that the device has no color gamut support at all and no further attention need be given to the descriptor. In a contrasting example, a bit value of "1" may indicate that the device has a color gamut support capability and that further bits must be examined to obtain the details as to what the capability is. For example, a second bit 602 can be read to determine whether the device supports ICC profiles, a third bit 603 can be read to determine whether the device supports simple profiles. Another bit (e.g. bit four 604) can be used to specify whether the device in question recognizes or uses flag indicators. Where such is the case, a fifth bit 605 can be read to determine whether "flag" bits must be consulted to determine which standard formats are supported. Another bit (e.g., bit six 606) could be used to set priorities either as to preferred color space or preferred color gamut support capabilities. Other bits can be used to specify, other features and gamut support capabilities as desired. Thus, a first descriptor 600 can comprise a single byte.

Figure 6B:
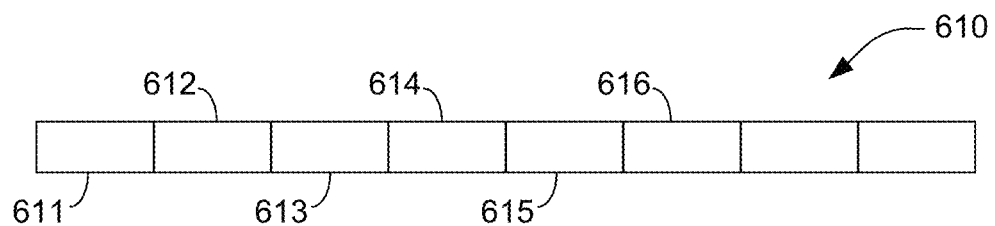

When, for example, the descriptor 600 indicates a flag indicated color gamut support capability is indicated, a second byte 610 can be consulted to determine standard color space is supported by the sink. As shown in the example of FIG. 6(b), another byte 610 can be used to indicate which standard color spaces are supported by the sink (alternatively it can form part of a data header to define the format of the following data). In this approach, the single byte can specify eight standard color spaces simply by indication using "flags" of indicator 610. Many other approaches could be employed and as such are contemplated by the inventors. In this example, a "1" in the associated bit indicates a color space is supported and a "0" can indicate no support for such a color space. For example, bit 0 (611) can be used to indicate support for the sRGB color space, bit 1 (612) can indicate support for the scRGB color space, bit 2 (613) can indicate support for the AdobeRGB color space, bit 3 (614) can indicate support for the DCI-P3 color space, bit 4 (615) can indicate support for the xvYCC601 color space, bit 5 (616) can indicate support for the xvYCC709 color space, and so on. Spaces can be reserved for future standards and so on. Also, further bits (or bytes) can be use to capture a greater array of standard formats. Referring back, to FIG. 6(a) the bit 606 could be used to indicate which one of the flagged standard formats is preferred. For example, it could refer to yet another byte which is configured to identify which color space is preferred for display. Or indeed, the spaces could be ranked in order of preference in the order in which they are presented in this additional byte.

Where an ICC profile is indicated (such as by second bit 602) another vastly larger descriptor can be used to specify the ICC profile format of the data. For example 128 byte header is specified, a tag count is included (e.g., another 4 bytes), a tag table can be included (generally, 12 bytes for each entry), then the tagged element data can be included. This profile can be extremely large comprising many, many, megabytes. Further details of this can be obtained using in the ICC specification associated with, for example, ICC.1:2004-10 (as indicated at, for example, www.color.org).

A simple profile can also be easily specified. For example, an entry for total profile size can be first, perhaps comprising a 16-bit integer or some other format. For example, a second entry in the format can define the luminance value for the white point. Followed by entries for x and y coordinates for the white point of the simple profile. Entries each of the x and y coordinates for each of the red, blue, and green points are also specified. Gamma parameters are also specified in accord with a specified format. One example of presenting gamma values $A_0$, $A_1$, $A_2$, $A_3$ is described above. Numerous other ancillary pieces of information can also be transmitted. But these are very small descriptors comprising just a few bytes which provide a massive advantage over the vast ICC profiles.

It should be pointed out that similar descriptors can be incorporated into image data a headers that describe the data to follow. Simple profiles can be specified, ICC profiles, as can the range of standard formats. Flags and an array of other indicators can be used as described above. This header and associated image data can be transmitted or stored. Storage media can include erasable memories (e.g., flash memory) or fixed storage media (e.g., DVD's).

In the modern multi-gamut environment, the invention meets and overcomes many of the challenges in generating color from one gamut (associated with the data format) and presenting it using another gamut (associated with another device). The disclosed method enables high fidelity gamut and color space support in order to attain the best possible color fidelity. In the conversion between standard formats a simple look up table can be used to convert from one color gamut to another. Any other approaches known to a person of ordinary skill in the art may also be employed. Additionally, as to simple profile encoding a variety of color conversion algorithms can be applied to enable effective and accurate conversion based on the parameters provided in the simple profile. Thus, the presently described approach for overcomes a number of color fidelity issues in addition to providing a flexible and easily usable framework for color gamut management among several devices. Thus, the inventive technology can faithfully display input video content using varying display gamut's (and correcting for input video limitations) and to maintain substantially similar color appearance over a wide range of differing display devices, each with their own color gamuts. Moreover, the disclosed approach can provide reasonably accurate wide gamut color space support.

The inventors also point out that a wide array of ancillary processing and functionality can be associated with the systems described herein. Such ancillary processing can include a wide array of signal processing operations. Examples include, but are not limited to denoising, size conversion, scaling, contrast enhancement, deinterlacing, deflicking, deblocking, interpolation, resampling, statistical post processing, softening, requantization, luminance alteration, telecine (pull up/pull down conversion), and so on. These ancillary processes can be introduced at a number of stages in the process. For example, in one approach, the ancillary processes can be performed before the modification or alternatively after modification or, in some alternative applications, these ancillary processes could be performed as part of the modification process.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An integrated circuit chip comprising:
   a content processing system configured to:
      receive input image data having color information encoded in accordance with a first format associated with a first color gamut;
      determine that input image data is encoded in the first format;
      receive sink device color gamut support capability and image modification capability information from a sink device in communication with the chip, and
      transmit output image data from the chip to the sink device, the output image data being encoded in one of the first format or a second format;
   a decision module configured to determine whether the output image data is transmitted to the sink device in one of the first format or the second format, the determination based on the color gamut support capability and image modification capability information received from the sink device, and
   a modification module configured to enable the selective modification of the input image data from the first color gamut to the second color gamut associated with the output image data, wherein the modification is performed in accordance with instruction from the decision module.

2. The chip recited in claim 1, wherein the decision module is configured to determine whether the modifying is to be performed by the modification module of the chip or at the sink based upon the image modification capability information received from the sink.

3. The chip recited in claim 2, wherein the decision module is configured to determine where the modifying is to be performed using at least one of,
   format information concerning the input image data;
   the sink device color gamut support capability information received from the sink device; and
   a priority which preselects where the modifying is to be performed.

4. The chip recited in claim 2, wherein the content processing system is configured to enable support of image data formatted in accordance with a three channel simple color profile.

5. The chip recited in claim 4, wherein the simple color profile comprises parameters for three primaries of color gamut and an associated white point.

6. The chip recited in claim 2, wherein the content processing circuitry is configured to support input image data encoded in accordance with at least one of a standardized format using a standard color gamut, a simple color profile, and an ICC profile.

7. A method for communicating image data between network devices in a multimedia network, the method comprising:
   identifying an encoding format of image data encoded in a first format associated with a first color gamut;
   receiving information relating to gamut support capability and image modification capability of a first network device in communication with a second network device;
   determining whether to modify the image data from the first color gamut to a second format compatible with a second color gamut associated with the first network device;
   where it is determined that the modification is not to be performed, forwarding the image data in the first format to the first network device;
   where it is determined that the modification is to be performed, determining whether the modification is to be performed by a second network device or by the first network device, the determination based on the received information relating to image modification capability of the first network device; and
   once a site is determined for modification, performing one of,
      conducting the modification at the second network device, or
      forwarding the image data to the first network device.

8. The method recited in claim 7 wherein when the determining determines that the mapping is to be performed at the first network device, receiving the forwarded image data at the first network device; and
   conducting the modification of the image data from the first color gamut to the second color gamut at the first network device.

9. The method recited in claim 7 wherein the first format of the image data is encoded using a simple color profile that specifies a three channel color format.

10. The method recited in claim 7, wherein the three channel color format of the simple color profile specifies parameters for three primaries of a native color gamut for the image data and a white point chromaticity for the image data, the three primaries defining a red reference, a green reference, and a blue reference for the native color gamut.

11. The method recited in claim 10, wherein the simple color profile includes parameters that specify a range of minimum and maximum values for each of red, green, and blue, and scaling parameters.

12. The method recited in claim 9, wherein the simple color profile further includes gamma correction parameters.

13. The method recited in claim 12, wherein the gamma correction parameters of the simple color profiles include gamma correction parameters enabling non-linear gamma correction.

14. The method recited in claim 11, wherein the scaling parameters include digital unit scale and zero bias.

15. The method recited in claim 7, wherein the first format comprises one of a standardized format using a standard color gamut, a simple color profile, and an ICC profile.

16. A computer implementable method embodied on a non-transitory tangible computer readable media, for communicating image data between network devices in a multimedia network, the method comprising compute readable instructions for:

identifying an encoding format of image data encoded in a first format associated with a first color gamut;

receiving information relating to gamut support capability and image modification capability of a first network device in communication with a second network device;

determining whether to modify the image data from the first color gamut to a second format compatible with a second color gamut associated with the first network device;

where it is determined that the modification is not to be performed, forwarding the image data in the first format to the first network device;

where it is determined that the modification is to be performed, determining whether the modification is to be performed by the second network device or by the first network device, the determination based on the received information relating to image modification capability of the first network device; and once a site is determined for medication, performing one of, conducting the modification at the second network device, or forwarding the image data to the first network device.

17. The computer implementable method recited in claim 16 wherein when the determining determines that the mapping is to be performed at the first network device, receiving the forwarded image data at the first network device; and conducting the modification of the image data from the first color gamut to the second color gamut at the first network device.

18. The computer implementable method recited in claim 16 wherein the first format of the image data is encoded using a simple color profile that specifies a three channel color format.

19. The computer implementable method recited in claim 16, wherein the three channel color format of the simple color profile specifies parameters for three primaries of a native color gamut for the image data and a white point chromaticity for the image data, the three primaries defining a red reference, a green reference, and a blue reference for the native color gamut.

20. The computer implementable method recited in claim 19, wherein the simple color profile includes parameters that specify a range of minimum and maximum values for each of red, green, and blue, and scaling parameters.

21. The computer implementable method recited in claim 18, wherein the simple color profile further includes gamma correction parameters.

22. The computer implementable method recited in claim 20, wherein the scaling parameters include digital unit scale and zero bias.

23. A system for use in communicating image data in a multimedia network, the system comprising:

a content processor configured to:

receive input image data having color information encoded in accordance with a first format associated with a first color gamut;

determine that input image data is encoded in the first format;

receive first network device color gamut support capability and image modification capability information from a first network device in communication with the chip, and transmit output image data from the chip to the first network device, the output image data being encoded in one of the first format or a second format;

a decision module configured to determine whether the output image data is transmitted to the first network device in one of the first format or the second format, the decision based on the color gamut support capability and image modification capability information received from the first network device, and a modification module configured to enable selective modification of the input image data from the first color gamut to the second color gamut associated with the output image data, wherein the modification is performed in accordance with instruction from the decision module.

24. The system recited in claim 23 wherein, the decision module determines whether the modifying is to be performed by the modification module of the system or at the first network device based upon the image modification capability information received from the first network device.

25. The system recited in claim 24 wherein, the decision module determines where the modifying is to be performed using at least one of, format information concerning the input image data;

the first network device color gamut support capability information received from the first network device; and a priority which preselects where the modifying is to be performed.

26. The system recited in claim 24, wherein the content processing system is configured to enable support of image data formatted in accordance with a simple color profile comprising parameters for three primaries of a color gamut and an associated white point.

* * * * *